United States Patent
Kuth

(10) Patent No.: US 6,410,996 B1
(45) Date of Patent: Jun. 25, 2002

(54) RADIOSHIELDED ASSEMBLY

(75) Inventor: Rainer Kuth, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/640,516

(22) Filed: May 1, 1996

(30) Foreign Application Priority Data

May 5, 1995 (DE) .......................................... 195 16 641

(51) Int. Cl.$^7$ ............................................... H01H 85/46
(52) U.S. Cl. ........................... 307/115; 307/89; 307/91; 307/113; 250/482.1; 337/199; 343/851
(58) Field of Search ................................. 307/115, 113, 307/89, 91, 100; 250/482.1; 337/194; 343/851

(56) References Cited

U.S. PATENT DOCUMENTS

| | | | | |
|---|---|---|---|---|
| 3,763,396 A | * | 10/1973 | Shilling ........................ | 315/307 |
| 4,333,137 A | * | 6/1982 | Asplund ....................... | 363/94 |
| 4,348,709 A | * | 9/1982 | Mauk et al. .................... | 361/92 |
| 4,492,878 A | * | 1/1985 | Hamel ......................... | 307/127 |
| 4,625,270 A | * | 11/1986 | Taylor ......................... | 363/39 |

FOREIGN PATENT DOCUMENTS

DE  OS 32 09 704  9/1983

OTHER PUBLICATIONS

"Ladegeräte" (Loading Apparatus) Unterrichtsblätter der Deutschen Bundespost, Unterrichtsblätter B 1954, No. 13/14, pp. 146–156.
"Ohne Datenverlust bei Netzausfall," Designbook 81, pp. 11–13.

* cited by examiner

Primary Examiner—Jonathan Wysocki
Assistant Examiner—Albert W. Paladini
(74) Attorney, Agent, or Firm—Schiff Hardin & Waite

(57) ABSTRACT

A radioshielded assembly contains components that require a d.c. supply and a multi-pole terminal arrangement connected between power supply terminals of the components and an external d.c. supply. At least one pole of the multi-pole terminal arrangement is fashioned for conducting a potential that differs from a reference potential. A switching stage is inserted between that pole of the terminal means that does not carry reference potential and the corresponding power supply terminals of the components. An actuation arrangement is in interactive communication with the switching stage, as a result of which the connected pole can be electrically connected to the power supply terminals or the pole can be disconnected from the power supply terminals and electrically connected to a reference potential so that interference signals cannot reach the components via the power supply lines. An arrangement of electrochemical elements is connected parallel to the power supply terminals for supplying power to the components when the pole is disconnected from the power supply.

8 Claims, 1 Drawing Sheet

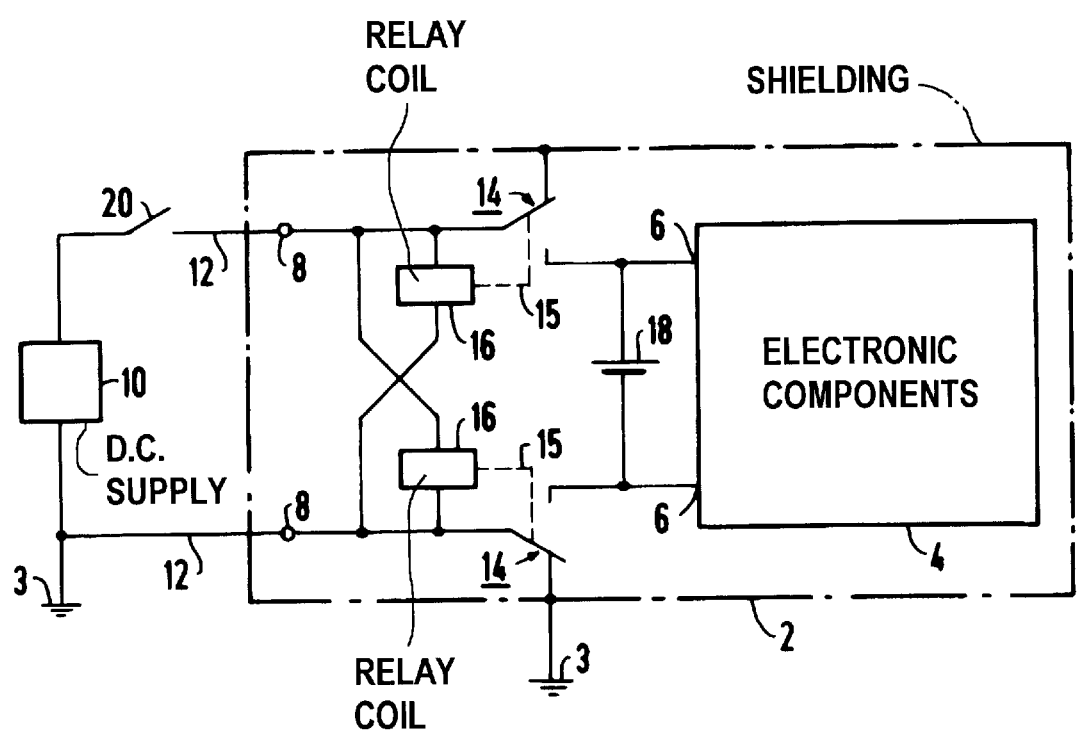

RADIOSHIELDED ASSEMBLY

BACKGROUND OF THE INVENTION

1. Field of the Invention

The present invention is directed to a radioshielded assembly having components that require a d.c. supply and having multi-pole terminal means that are connected, between power supply terminals of the components and fashioned an external d.c. power supply, with at least one pole of the multi-pole terminal means being fashioned for conducting a potential that differs from a reference potential.

2. Description of the Prior Art

Electronic assemblies that are operated in radiofrequency measuring chambers require special radioshielding measures in order to avoid an influence of alternating electromagnetic fields on the actual measuring system in the measuring compartment. One such measure is to dispose the power supply for the assembly outside the radiofrequency measuring chamber and power is supplied to the assembly as a d.c. voltage or current. When, however, the electrical power consumed by the assembly is so high in the radiofrequency range that the radiofrequency measuring system operated in the measuring chamber could be disturbed, then the power supply lines must also be radioshielded. These measures, however, can still be inadequate under certain circumstances. When, for example, an LCD monitor having a high resolution of 1024×1280 points and an image or frame repetition rate of 60 Hz is to be operated inside a nuclear magnetic resonance measuring chamber, even a shielding of the d.c. leads can be inadequate.

SUMMARY OF THE INVENTION

It is an object of the present invention to provide a radioshielded assembly wherein radiofrequency interference emanating from the power leads is suppressed.

This object is achieved in a radioshielded assembly of the type initially described wherein a switch is inserted between that pole of the terminal means that does not carry reference potential and the corresponding power supply terminals of the components with an actuation means in interactive communication with the switch which permit the connected pole to be electrically connected to the power supply terminals or to be disconnected from the power supply terminals and electrically connected to a reference potential and wherein an arrangement of electrochemical elements is connected in parallel with the power supply terminals. The disconnection of the assembly from the external power supply ensues only during the measuring mode in the radiofrequency measuring chamber, while the assembly continues to be supplied with electrical energy via the electrochemical elements in the form of a battery or rechargeable accumulator. The assembly can be connected to the external power supply during measuring pauses.

In one embodiment a switch is inserted between each pole of the terminal means and between the corresponding power supply terminals of the components and the actuation means is in interactive communication with the switch, as a result of which the connected poles can be connected to the corresponding power supply terminals or the poles can be disconnected from the power supply terminals and electrically connected to a reference potential. The disconnection of all poles from the external power supply and the limitation of the power supply lines in terms of potential suppresses the radiofrequency interference emanating from the reference potential lead, even though this interference is only slight.

When the assembly itself emits radiofrequency interference to a noteworthy extent, the disturbing effects can be suppressed according to a further embodiment wherein at least one component, namely the interfering component, is surrounded by a shielding that lies at reference potential.

An automatic switching at the assembly can ensue according to another embodiment wherein the actuation means are formed by a relay coil.

The relay coil can be electrically connected to the multi-pole terminal means and power supply lines can be connected to the e multi-pole terminal means, and a control contact for the actuation of the relay coil can be inserted into at least one of the lines connected to the relay coil. A separate control line for the relay coil can thus be foregone.

In another embodiment secondary elements are utilized as the electrochemical elements. The secondary elements can be recharged by the external power supply during pauses in the operation of the radiofrequency measuring system.

DESCRIPTION OF THE DRAWINGS

The single FIG. is a schematic block diagram of a radioshielded assembly constructed and operating in accordance with the principles of the present invention.

DESCRIPTION OF THE PREFERRED EMBODIMENTS

The drawing schematically shows an electronic assembly that is completely surrounded by a shielding 2 connected to a reference potential 3, so that the assembly itself does not emit any interference in the radiofreqeuncy frequency range. The assembly contains components such as transistors, electronic gates and memories, switches, signal lamps and the like, symbolized by the block 4. The assembly is especially suited for operation in a radiofrequency measuring chamber (not shown), for example a measuring chamber for a nuclear magnetic resonance apparatus. For operation, the components 4 require a d.c. supply that is delivered via power supply terminals 6. A multi-pole terminal arrangement 8, to which an external d.c. supply 10 is connected, is disposed inside the shielding. Releasable terminals such as, for example, plugs and sockets or non-releasable terminals such as, for example, soldered, pinch, clamp or screw-t type connections can form the multi-pole terminal arrangement 8. The external power supply 10 is generally located outside the radiofrequency measuring chamber and is detachably or permanently connected to the multi-pole terminal arrangement 8 via power supply lines 12. An assembly that requires only one power supply voltage is shown here as an example.

A switching stage 14 is inserted in side the shielding 2 with a switch between each pole of the terminal arrangement 8 and the corresponding power supply terminals 6 of the components 4. The switching stage 14 is in interactive communication with an actuation arrangement, the communication being illustrated with broken lines 15, so as to enable a connection of the respective pole 8 either to the shielding 2 or to the corresponding power supply terminal 6. Here, each switching stage 14 can be part of a relay, whose relay coil 16 is connected in parallel with the terminal means 8.

Given the position of the switching stage 14 is shown in the drawing, the power supply of the components 4 ensues via an arrangement of electrochemical secondary elements 18 connected to the power supply terminals 6, i.e. via a rechargeable battery. The number of electrochemical elements 18 is determined by the required supply voltage, whereas the capacity thereof is predetermined by the intended operating duration and the inactive or standby times of the radiofrequency measuring system.

The switching stage 14 is controlled via the relay coils 16 such that, when the control contacts 20 for the external power supply 10 is closed the relay coils 16 are thus energized, the terminal arrangement 8 is connected via the switching stage 14 to the power supply terminals 6 and simultaneously to the arrangement of secondary elements. The external power supply 10 thus operates as charging means for the battery in addition to operating as the power supply of the components 4.

The control contact 20 is arranged in the immediate proximity of the power supply 10, as a result of which the power supply line 12 cannot conduct interference generated by the external power supply 10 into the radiofrequency measuring chamber.

Although modifications and changes may be suggested by those skilled in the art, it is the intention of the inventors to embody within the patent warranted hereon all changes and modifications as reasonably and properly come within the scope of their contribution to the art.

I claim as my invention:

1. A radioshielded assembly for use with a d.c. power supply, said d.c. power supply having a terminal at reference potential and a further terminal at a potential differing from reference potential, said radioshielded assembly comprising:

a plurality of electrical components operable by said d.c. power supply;

multi-pole terminal means for connecting said electrical components to said d.c. power supply, said multi-pole terminal means having a pole connected to said terminal at reference potential and a further pole connected to said further terminal;

a switch connected between said further terminal and said further pole;

actuation means for operating said switch for selectively disconnecting said further pole from said further terminal and connecting said further pole to reference potential; and electrochemical power supply elements connected in parallel with said terminal at reference potential and said further terminal for supplying power to said electrical components when said further pole is connected to reference potential.

2. A radioshielded assembly as claimed in claim 1 wherein said d.c. power supply has a plurality of further terminals at respectively different potentials differing from reference potential, wherein said multi-pole terminal means comprises a plurality of further poles respectively connected to said further terminals of said d.c. supply, and said assembly further comprising a plurality of switches respectively connected between each further pole of said multi-pole terminal means and the further terminal of said d.c. supply connected thereto, and wherein said actuation means comprises means for individually actuating each switch for selectively disconnecting each further pole of said multi-pole terminal means from the d.c. supply and connecting that further pole to reference potential.

3. A radioshielded assembly as claimed in claim 1 further comprising a shielding at reference potential surrounding said electrical components, through which said multipole terminal means extends.

4. A radioshielded assembly as claimed in claim 3 wherein said switch is disposed inside said shielding.

5. A radioshielded assembly as claimed in claim 1 wherein said actuation means comprises a relay coil.

6. A radioshielded assembly as claimed in claim 5 wherein said relay coil is electrically connected to said multi-pole terminal means, wherein said d.c. power supply is connected to said multi-pole terminal means via power supply lines, and further comprising a control contact for actuating said relay coil connected in at least one of said power supply lines.

7. A radioshielded assembly as claimed in claim 6 wherein said control contact is disposed adjacent said d.c. power supply.

8. A radioshielded assembly as claimed in claim 1 wherein said electrochemical elements comprise secondary elements.

* * * * *